US005850232A

United States Patent [19]

Engstrom et al.

[11] Patent Number: 5,850,232

[45] Date of Patent: Dec. 15, 1998

[54] METHOD AND SYSTEM FOR FLIPPING IMAGES IN A WINDOW USING OVERLAYS

[75] Inventors: G. Eric Engstrom; Craig G. Eisler, both of Kirkland, Wash.

[73] Assignee: Microsoft Corporation, Redmond, Wash.

[21] Appl. No.: 639,333

[22] Filed: Apr. 25, 1996

[51] Int. Cl.[6] ...................................................... G06F 13/00

[52] U.S. Cl. .......................... 345/511; 345/113; 345/431; 345/435; 345/342; 345/501

[58] Field of Search .................................... 395/133, 135, 395/131, 501, 502, 507, 508, 509, 515, 511, 332–334, 339–345; 345/185, 187, 189, 201, 200, 186, 133

[56] References Cited

U.S. PATENT DOCUMENTS

| | | | |
|---|---|---|---|
| 5,394,523 | 2/1995 | Harris | 395/131 |
| 5,428,722 | 6/1995 | Marsh et al. | 395/133 |
| 5,455,599 | 10/1995 | Cabral et al. | 345/133 |
| 5,515,494 | 5/1996 | Lentz | 395/344 |
| 5,519,825 | 5/1996 | Naughton et al. | 395/950 |

OTHER PUBLICATIONS

Implementing Games for Windows Using the WinG API and the WaveMix DLL, James Finnegan, Microsoft Systems Journal, pp. 61–81, Jan., 1995.

Computer Graphics'88, Proceedings of the conference held in London, Oct. 1988, "one frame ahead: frame buffer management for animation and real–time graphics" K. Auel.

*Primary Examiner*—Kee M. Tung

*Attorney, Agent, or Firm*—Klarquist, Sparkman, Campbell, Leigh, & Whinston LLP

[57] ABSTRACT

A method for flipping an image in a window using overlays involves creating an overlay flipping structure and using this structure to control "flipping" of an overlay image in a display device that supports overlays. A display device interface includes services to create and manipulate an overlay flipping structure including a front buffer and a back buffer. To flip in a window, an application program draws its image to the back buffer of the flipping structure while the overlay control in the display controller reads the overlay image from the front buffer. The overlay control superimposes the overlay in the front buffer with the image in the frame buffer. The display device interface controls the flipping of the overlay by determining when it can change the address of the overlay image used by the display controller without causing flipping.

19 Claims, 10 Drawing Sheets

METHOD AND SYSTEM FOR FLIPPING IMAGES IN A WINDOW USING OVERLAYS

This application is related to the following co-pending U.S. patent applications, which are commonly assigned:

Resource Management For Multimedia Devices In A Computer by Craig G. Eisler and G. Eric Engstrom, filed on Apr. 25, 1996 as application Ser. No. 08/396,522;

Method And System In Display Device Interface For Managing Surface Memory by G. Eric Engstrom and Craig G. Eisler, filed on Apr. 25, 1996 as application Ser. No. 08/641,015;

Multimedia Device Interface For Retrieving And Exploiting Software And Hardware Capabilities by G. Eric Engstrom and Craig G. Eisler, filed on Apr. 25, 1996 as application Ser. No. 08/641,017;

Display Device Interface Including Support For Generalized Flipping Of Surfaces by Craig G. Eisler and G. Eric Engstrom, filed on Apr. 25, 1996 as application Ser. No. 08/641,014;

Method And System For Managing Color Specification Using Attachable Palettes And Palettes That Refer To Other Palettes by Craig G. Eisler and G. Eric Engstrom, filed on Apr. 25, 1996 as application Ser. No. 08/641,016; and System For Enhancing Device Drivers by Craig G. Eisler and G. Eric Engstrom, filed on Apr. 25, 1996 as application Ser. No. 08/637,530.

These applications are hereby incorporated by reference.

TECHNICAL FIELD

The invention relates to graphical user interfaces for computers, and more specifically relates to a method for flipping images in a window in computer systems with windowing environments.

BACKGROUND OF THE INVENTION

In computer generated graphics, a technique known as "screen flipping" is commonly used to provide smooth animation. In this technique, two memory buffers in video memory are used to generate an image. While a first image is being rendered to a first buffer, the display hardware scans out a complete image from a second buffer. To update the display with a new image, the display hardware then performs a buffer swap. The display image that was just under construction is then transferred to the display screen, and a new image is constructed in the buffer that held the previous display image.

Screen flipping is necessary in some applications to prevent tearing. Tearing occurs where the display controller attempts to display part of an image that an application is trying to draw. When this occurs, part of the next frame appears in the current frame, and as a result, parts of the image appear to be torn. Screen flipping prevents this problem by ensuring that an application never draws an image to a portion of memory currently in use by the display controller.

While screen flipping is useful for applications where the entire display screen is flipped, it does not apply in cases where an application wishes to flip only a portion of display image. Consider for example a windowing environment where a number of application programs present there displays in specially delineated areas in the display screen. In this type of environment, the user interface typically comprises a main or parent window that occupies the entire display screen and one or more child windows located within the parent window and occupying less than the entire display. The user can move, resize, and overlap several windows. In this context, when the display hardware performs a screen flip, it flips the entire display, not the individual windows.

The inability to flip an image in a window can be a significant limitation for graphical applications running in a window. For example, a game application running in a window may need to be updated faster than other windows in the interface to achieve more realistic animation. Flipping the entire screen in this example is not satisfactory because another application or several applications are using the display outside the game's window. If the entire screen were flipped to update the game's window, the flip would swap the rest of the display screen out of view. Screen flipping in this context, therefore, conflicts with the other application's use of the display.

SUMMARY OF THE INVENTION

The invention provides a method for flipping images in a window using overlays. The support for flipping images in a window is implemented in a software interface for a display device in a computer. In this context, it enables application programs to flip in a window without disturbing other parts of the display image.

A method for flipping in a window using overlays begins by creating an overlay flipping structure to represent an overlay. An overlay refers to a pixmap that is superimposed onto a display image during display generation. The overlay flipping structure has a front and back buffer structure that represent regions in video memory. Once the overlay flipping structure is created, an application can draw its display frame to the back buffer of the flipping structure. To make a rendered overlay visible on the display screen, the application flips the front and back buffers. As the application draws a display frame to the back buffer, the overlay control in the display controller reads a rendered overlay from the front buffer.

In one implementation of the method, support for flipping in a window using overlays is implemented in a display device interface. The display device interface has services to support flipping of pixel memory, and specifically, to support flipping of overlays. These services include an operation to create a flipping structure, an operation to control flipping of pixel memory, and operations to manage access to pixel memory. To create an overlay flipping structure, an application invokes the operation to create a surface structure and specifies that the surface is a flippable overlay. In response, the display device interface creates a flipping structure with a front and back buffer.

Once an application has created a flipping structure it can then render an overlay. To achieve smooth animation, the application renders its next display frame to the back buffer. The display device interface manages access to the front and back buffer. During a flip operation, for example, the back buffer cannot be modified. In addition, when an application or the display controller access a surface, other applications or clients of the surface are prevented from accessing the surface or a part of the surface being used.

Further features and advantages of the invention will become apparent with reference to the following detailed description and accompanying drawings.

DETAILED DESCRIPTION

Figure 1:
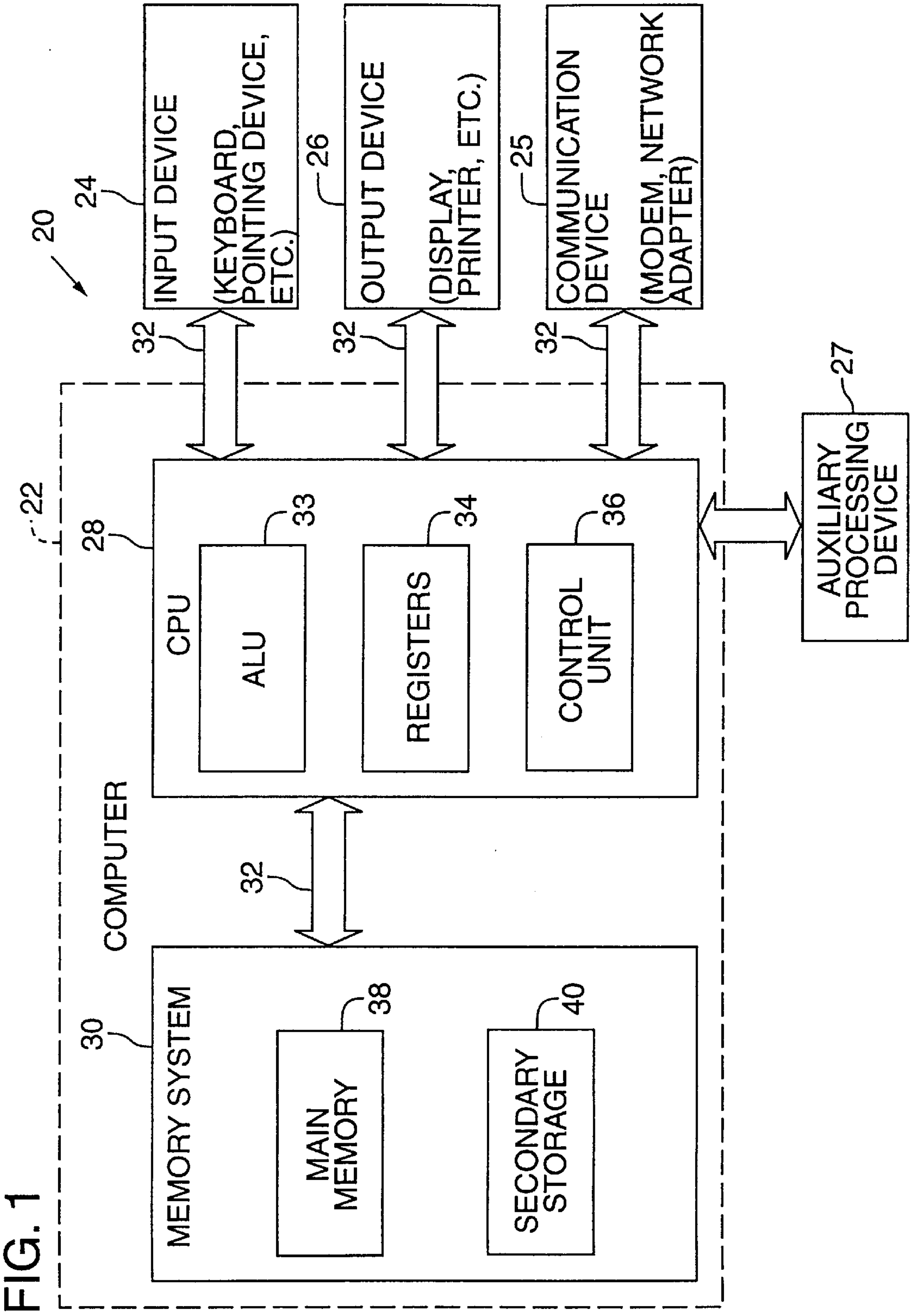
FIG. 1 is a general block diagram of a computer system in which an embodiment of the invention can be implemented.

FIG. 1 is a general block diagram of a computer system 20 in which an embodiment of the invention can be implemented. The computer system 20 includes as its basic elements a computer 22, one or more input devices 24 and one or more output device 26. The computer system can also include a communication device 25 and an auxiliary processing device 27.

Computer 22 generally includes a central processing unit (CPU) 28 and a memory system 30 that communicate through a bus structure 32. CPU 28 includes an arithmetic logic unit (ALU) 33 for performing computations, registers 34 for temporary storage of data and instructions and a control unit 36 for controlling the operation of computer system 20 in response to instructions from a computer program such as an application or an operating system.

Memory system 30 generally includes high-speed main memory 38 in the form of a medium such as random access memory (RAM) and read only memory (ROM) semiconductor devices, and secondary storage 40 in the form of a medium such as floppy disks, hard disks, tape, CD-ROM, etc. or other devices that use optical, magnetic or other recording material. Main memory 38 stores programs such as a computer's operating system and currently running application programs. In some implementations, portions of main memory 38 may also be used for displaying images through a display device.

Input device 24 and output device 26 are typically peripheral devices connected by bus structure 32 to computer 22. Input device 24 may be a keyboard, pointing device, pen, joystick, head tracking device or other device for providing input data to the computer.

Output device 26 may be a display device, printer, sound device or other device for providing output data from the computer.

The communication device 25 can include any of a variety of peripheral devices that enable computers to communicate. For example, the communication device can include a modem or a network adapter (25).

The auxiliary processing device 27 refers generally to a peripheral with a processor for enhancing the performance of the computer. One example of an auxiliary processing device is a graphics accelerator card.

It should be understood that FIG. 1 is a block diagram illustrating the basic elements of a computer system; the figure is not intended to illustrate a specific architecture for a computer system 20. For example, no particular bus structure is shown because various bus structures known in the field of computer design may be used to interconnect the elements of the computer system in a number of ways, as desired. CPU 28 may be comprised of a discrete ALU 33, registers 34 and control unit 36 or may be a single device in which one or more of these parts of the CPU are integrated together, such as in a microprocessor. Moreover, the number and arrangement of the elements of the computer system may be varied from what is shown and described in ways known in the art.

The invention may be implemented in any of a number of well-known computer systems. For instance, the invention may be implemented in a personal computer (PC), such as IBM-AT compatible computers or computer systems based on the 80386, 80486, or Pentium processors from Intel Corporation. Alternatively, the invention may be implemented on any number of computer workstations, such as machines based on a RISC (reduced instruction set computing) architecture. The above systems serve as examples only and should not be construed as limiting the type of computer system in which the invention may be implemented.

Figure 2:
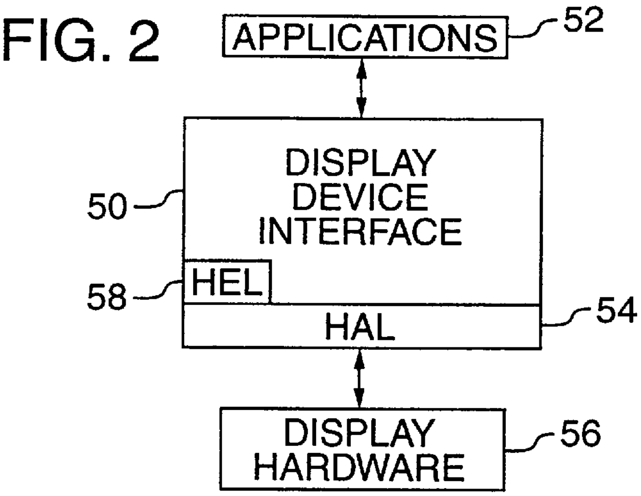
FIG. 2 is a block diagram illustrating the architecture of a device interface in which one embodiment of the invention is implemented.

FIG. 2 is a block diagram illustrating the architecture of a display device interface 50 in which an embodiment of the invention is implemented. This diagram illustrates relationships between application programs ("applications") 52, the display device interface 50, the hardware abstraction layer 54, and the display hardware 56. Applications 52 access the display hardware 56 through the display device interface 50, which serves as a device independent interface to the display hardware 56. The display device interface 50 performs parameter validation, memory management of the video memory, and bookkeeping for the interface. We describe specific features of the interface in further detail below.

The HAL (hardware abstraction layer) 54 is a hardware dependent interface to the display hardware 56. In this embodiment, the HAL includes only hardware specific code. It can be an integral part of the display hardware 56, or in the alternative, can be implemented in software on the host computer (22 in FIG. 1, for example). In the latter case, the HAL is typically implemented as a dynamic linked library (DLL). The HAL is implemented by and available from the manufacturer of the display card or chip.

The display device 50 interface can optionally include a hardware emulation layer (HEL) 58 to emulate display hardware features if they are not available in the display hardware.

The display hardware 56 includes the hardware devices within and/or coupled to the host computer that are responsible for displaying visual data including 2D and 3D rendered graphics and animation, video, text and still images.

Figure 3A:
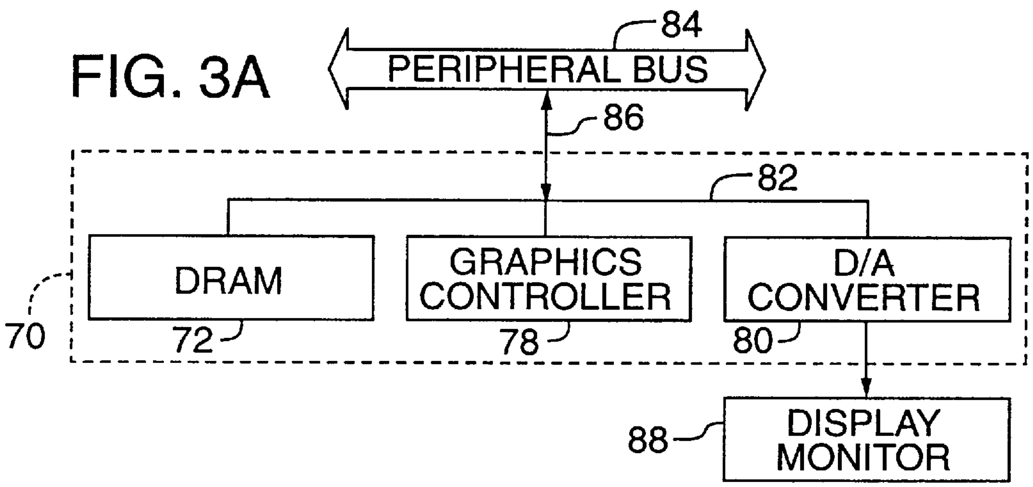
FIGS. 3A, 3B, 3C, and 3D are block diagrams showing four examples of display device architectures.
Figure 3B:
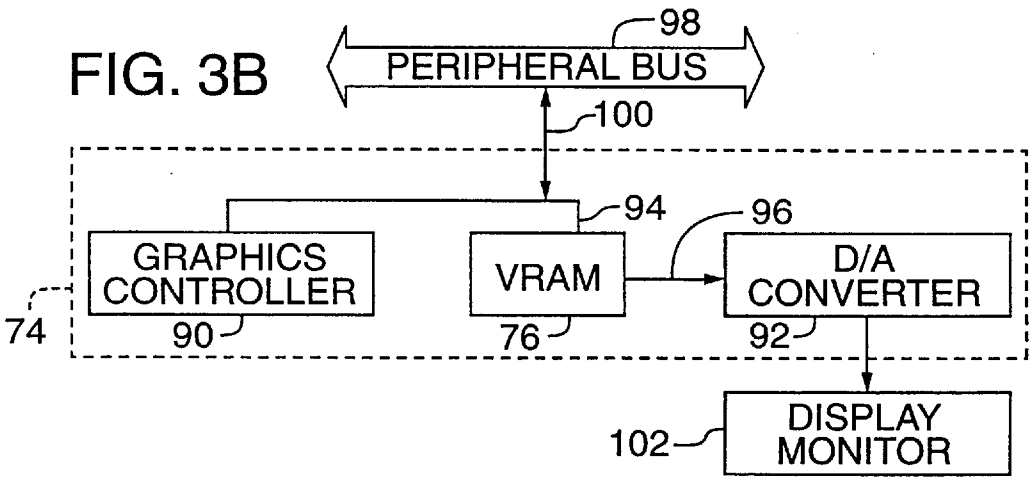
Figure 3C:
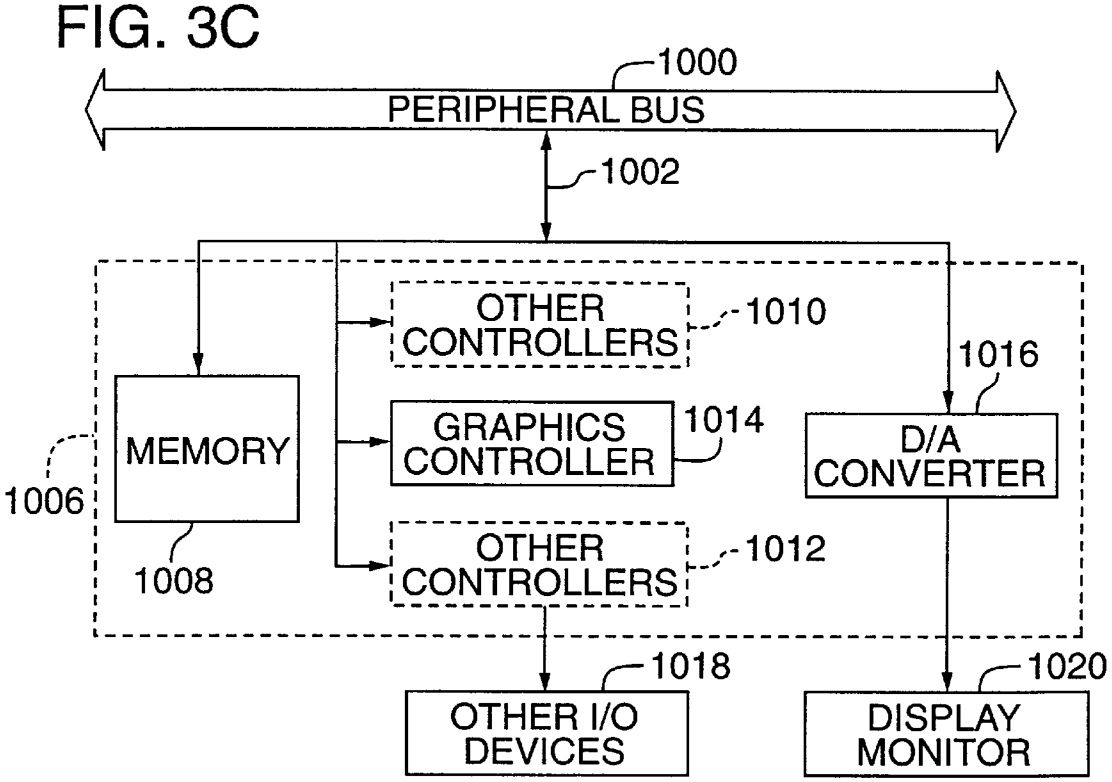
Figure 3D:
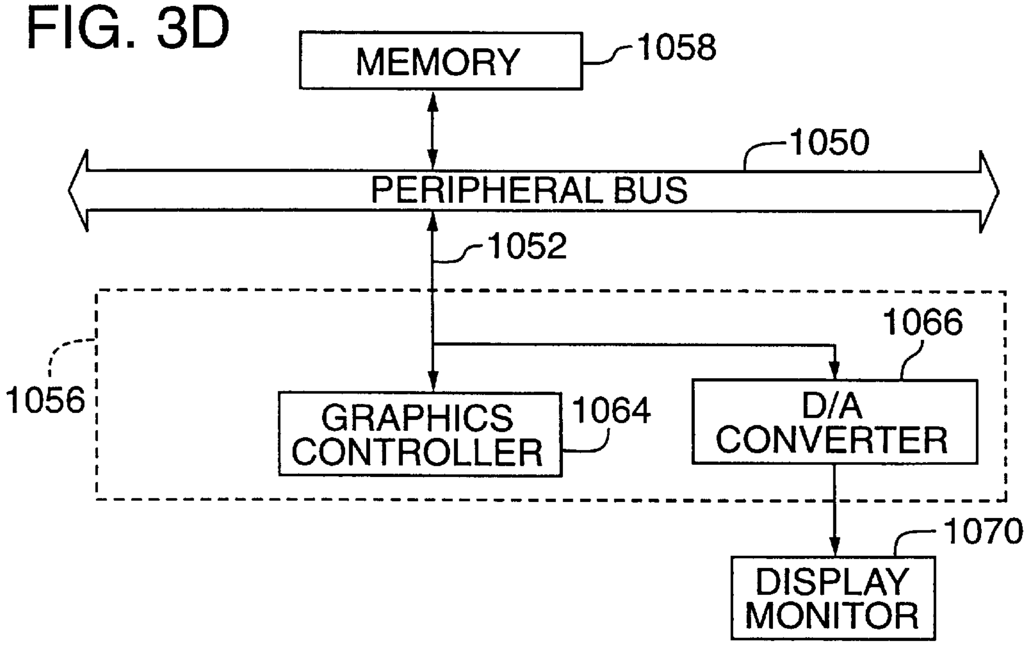

FIGS. 3A, 3B, 3C, and 3D are block diagrams showing four examples of display device architectures. FIG. 3A illustrates the architecture of a video card 70 which includes video memory implemented with DRAM (dynamic random access memory) 72. FIG. 3B illustrates the architecture of a display card 74 which includes video memory implemented with VRAM (video random access memory) 76. The video cards shown in FIGS. 3A and 3B represent only two examples of video cards with significant on board memory in common use today. For example, there are numerous types of RAM (random access memory) used on video cards. VRAM and DRAM are just two common examples. The display device interface 50, shown generally in FIG. 2, is designed to be compatible with a wide variety of display controllers whether implemented in a video card, in a video chip in the computer, or some other configuration. FIG. 3C illustrates the architecture of a multimedia card where the memory used by the display card is shared with other accelerators. FIG. 3D illustrates the architecture of a display card where the memory used by the display card is shared with the host processor. The display device interface is intended to work across any of these architectures, combinations of them, or other architectures for storing and composing pixmaps onto a display device.

The video card in FIG. 3A includes as its basic elements a graphics controller 78, video memory 72 implemented with DRAM, and a digital-to-analog converter 80. In this type of video card, each of these elements share a common bus 82. On one side, the video card is connected to a bus 84 on the host computer via a bus interface 86. On the other side, the video card is connected to a physical display device such as a display monitor 88. To generate the video display, the video card 70 receives image data and display commands from the host computer (22, for example) and controls the transfer of image data to a display monitor 88. The graphics controller 78 is responsible for acceleration and other graphics operations. When the digital-to-analog converter 80 needs to take the digitally represented image data from the DRAM and send it to the monitor, the graphics controller 78 is placed on hold until the DAC 80 finishes its task.

The video card 74 in FIG. 3B includes a graphics controller 90, video memory 76 implemented with VRAM, and a DAC 92. One significant difference between the design of this card and the card in FIG. 3B is that the graphics controller 90 and DAC 92 access the VRAM 76 through separate ports (94, 96). Coupled to a peripheral bus 98 of the host computer via a bus interface 100, the video card 74 receives image data and commands from its host and controls the display of image data stored in the video memory 76. Since the VRAM is dual ported, the DAC 92 can transfer image data to the monitor 102 as the graphics controller 90 performs operations on other image data in the video memory.

The video card 1006 in FIG. 3C includes a graphics controller 1014, "video" memory 1008 (which is not specific to any particular technology used to implement the memory), and a DAC 1016. One significant difference between the design of this card and the card in FIG. 3B is that the graphics controller 1014 shares the "video" memory with other controllers 1010/1012 and the DAC 1016. There are many memory architectures for these types of cards and the device display interface supports all of them. Coupled to a peripheral bus 1000 of the host computer via a bus interface 1002, the video card 1006 receives image data and commands from its host and controls the display of image data stored in the "video" memory 1008. Arbitration between other controllers can be handled either in the HAL or by the hardware.

The video card 1056 in FIG. 3D includes a graphics controller 1064, "video" memory 1058 (which is not specific to any particular technology used to implement the memory), and a DAC 1066. One significant difference between the design of this card and the card in FIG. 3B is that the graphics controller 1064 shares the "video" memory with the host processor and the DAC 1066. There are many memory architectures for these types of cards and the device display interface supports all of them. Coupled to a peripheral bus 1050 of the host computer via a bus interface 1052, the video card 1056 receives image data and commands from its host and controls the display of the image data on the display monitor 1070. Arbitration between other peripherals on the bus can be handled either in the HAL, by the video card 1056, by the operating system, or the bus.

The display device interface 50 shown in FIG. 2 acts as an interface to display hardware such as the video cards (70, 74, 1006, 1056) illustrated in FIGS. 3A, 3B, 3C and 3D. The display device interface 50 enables applications to access video memory (72, 76, 1008, 1058, for example), including both off screen and on screen memory. It also gives the applications access to special purpose graphics hardware (78, 90, 1014, and 1064, for example), where available, to enhance performance. In cases where the underlying graphics hardware does not support a requested service, the interface can potentially emulate the service through the software in the HEL 58.

The display device interface shown in FIG. 2 supports flipping an image in a window using overlays. In one embodiment of this method, an application flips its display image in a window using the support for overlays in the display controller. The specific manner in which overlays are supported in the display hardware can vary. One way to support overlays in video cards is to include overlay control functions in the graphics processor of the video card. In this case, the graphics processor superimposes an image in one region of video memory with another region in video memory holding the display image. Because the specifics of the underlying hardware can vary, we use the term overlay control to refer generally to the display hardware for superimposing an overlay with a region in video memory being converted into the display image.

Examples of display controllers that support overlays include: the Cirrus 5440, 5446 from Cirrus Logic, Inc. and the S3 765 from S3 Corporation.

The support for flipping in a window in the invention is particularly suited for windowing environments where an animated graphics application runs in one window, while other applications and the user interface of the operating system run in other windows. In this context, the performance of the animated graphics application can be enhanced by performing flipping in video memory. The support for flipping in a window in the display device interface enables an application to flip its display within a window without disturbing the rest of the display screen. This approach to flipping in a window is applicable to a variety of graphical and video applications which can benefit from flipping to achieve the effect of smooth and continuous animation or video. Thus, while flipping in a window is especially beneficial for real time graphics applications, it can be exploited by a variety of other types of applications as well.

One aspect of flipping in a window is the application's control of the size and position of its window. A window in this context refers to a specially delineated area of the display screen where the application presents its display. There are a number of windowing environments in use today, including the user interfaces of the Windows® family of operating systems from Microsoft Corporation and the operating system of the Apple MacIntosh of Apple Computer. In one embodiment for the Windows® 95 Operating System, the application monitors the position and size of its window using messages generated by the operating system. The application monitors the position and size of its window so that it can properly instruct the display hardware to position the overlay in the primary surface.

In addition to monitoring the size and position of the window, the application performs a color fill operation to set the color of its window to a color key. This color key is then used by the overlay control of the display controller to superimpose an overlay in the application's window. To perform this color fill in an implementation for Windows 95 operating system, the application can invoke use the Graphics Device Interface (GDI) to paint the entire window to the color of the color key. Alternatively, the application can use a bit request with a color fill option in the display device interface to paint the color of its window to the color key.

To support flipping in the window, the application asks the display device interface to create a flipping structure including a front and back buffer to represent an overlay surface. The display device interface manages the application's access to the back buffer and also synchronizes the display controllers access to the front buffer. While the application renders its image to the back buffer of the flipping structure, the overlay control in the display hardware reads the image in the front buffer. When the application has completed rendering the next frame to the back buffer, it flips the front and back buffer. The overlay control then updates the image in the window by superimposing the new image in the front buffer with the primary surface at the proper location.

In addition to the overlay structure, the application also asks the display device interface to create a primary surface structure to represent the frame buffer. The frame buffer is the region in video memory that stores the pixmap to be displayed on the display monitor. In response, the display device interface creates a structure representing the primary surface. The primary surface structure stores the location in video memory of the primary surface as well as other attributes about the surface such as the pixel format, resolution, width and height etc. The application creates this primary surface structure in this implementation so that the display device interface knows where to place the overlay in the frame buffer.

The primary surface structure refers to the same region in video memory that other applications or processes in the computer are currently manipulating. For example in an implementation for the Windows 95 operating system, other applications (other than the one flipping in a window) use GDI to write to the frame buffer. While the application draws to the overlay surface, the other applications using the display continue to draw to the frame buffer unaware of the overlay.

Figure 4A:
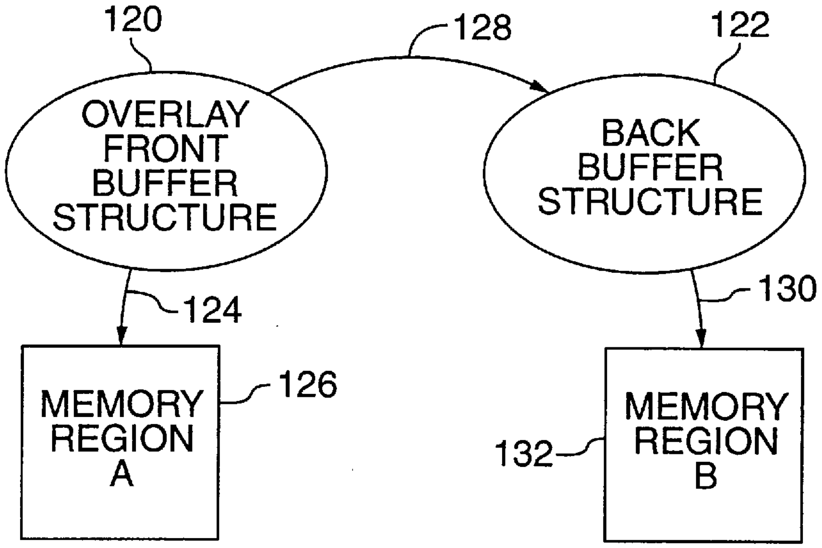
FIGS. 4A and 4B are diagrams illustrating an example of a flipping structure with a front and back buffer.

FIG. 4A is a diagram illustrating a flipping structure used to flip overlay surfaces. The flipping structure includes front buffer and back buffer structures 120, 122. In this implementation, the front buffer structure maintains a reference 124 to a memory region 126 currently serving as the front buffer (memory region A, in this case), as well as an attachment link 128 to the back buffer structure 122. The back buffer structure 122 maintains a reference 130 to a memory region (memory region B) 132 currently serving as the back buffer.

Figure 4B:
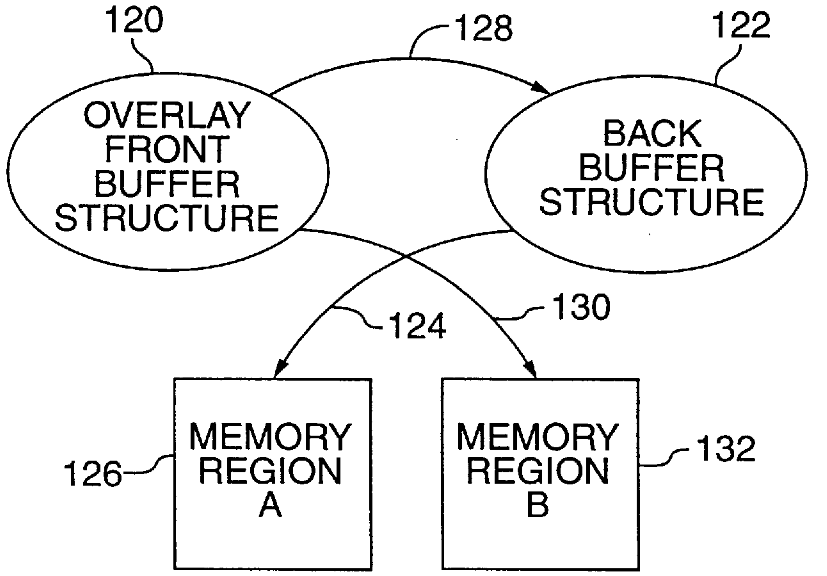

FIG. 4B is a diagram illustrating the state of the flipping structure after a flip. The flip operation exchanges the underlying surface memory such that the reference in the front buffer structure now refers to memory region A while the reference in the back buffer structure refers to memory region B.

To render an image into an overlay surface, the application constructs the image in the back buffer of the flipping structure representing the overlay surfaces. The display device interface provides a number of services to enable applications to render the images into surface memory including operations to perform bit block transfers from one memory region to another and to synchronize access to surface memory.

Figure 5:
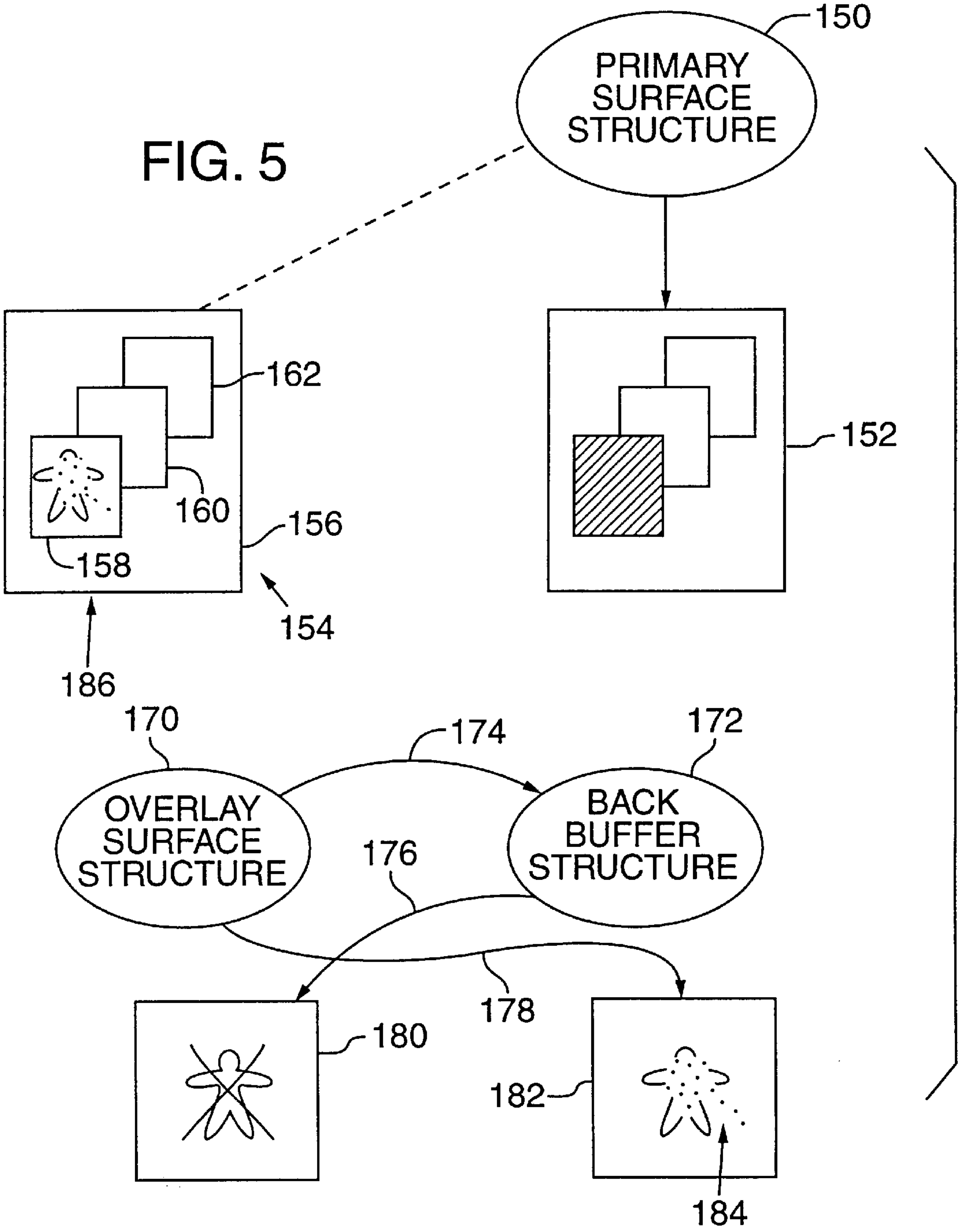
FIG. 5 is a diagram depicting an example of surface structures and corresponding overlay surfaces used during the process of flipping in a window.
Figure 6:
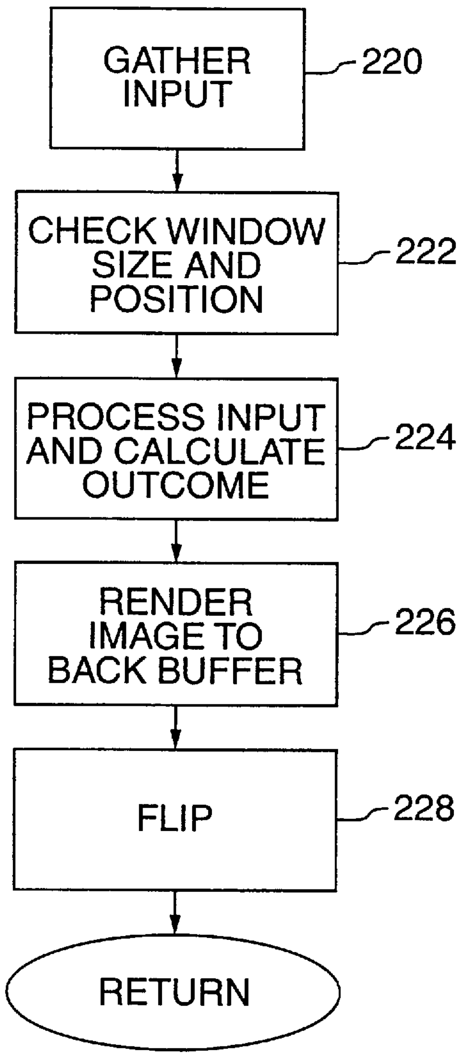
FIG. 6 is a flow diagram illustrating an example of how flipping in a window can be used in the context of a game application.
Figure 7:
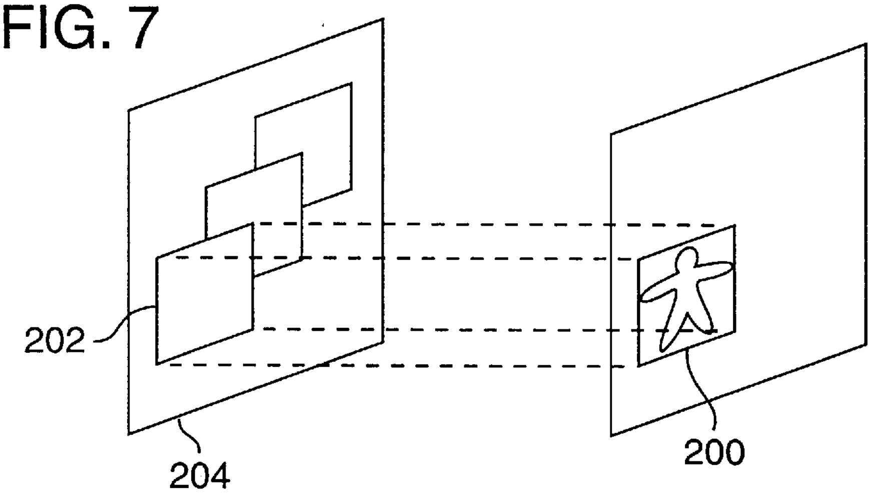
FIG. 7 is a diagram showing how the display controller superimposes the an overlay surface in the process of generating the display image.

FIGS. 5–7 illustrate an example of flipping in a window using overlays. FIG. 5 is a diagram depicting an example of surface structures and a corresponding overlay surface after a flip operation. FIG. 6 is a flow diagram illustrating an example of how flipping in a window can be used in the context of a game application. Finally, FIG. 7 is a diagram showing how the display controller superimposes the an overlay surface in the process of generating the display image.

To set the scene for the flip operation, we first describe the state of the surface structures before the flip. As shown in FIG. 5, the primary surface structure 150 refers to surface memory 152 holding the image displayed on the monitor's screen 154. In this example, the display screen includes a main window 156 and several overlapping child windows 158–162. The application's window 158 is in the foreground and overlaps other windows 160, 162 in a cascaded arrangement. The surface memory 152 associated with the primary surface structure holds an array of pixel values representing the image on the display screen 154.

The overlay flipping structure includes a front buffer structure 170 and a back buffer structure 172, attached via an attachment link 174. The front and back buffer structures include reference pointers 176, 178 to corresponding memory regions 180,182. Before a flip of the overlay surface structure, the front surface memory holds a 180 pixmap of monster, which is superimposed on the application's window in the display. The overlay surface appears on the display screen because the display hardware has superimposed it onto the application's window 158 in the primary surface during the process of generating the display image.

The back buffer structure shown in FIG. 5 refers to the next overlay surface, which the display controller will superimpose in the application's window after a flip operation. In this example, the back buffer 182 holds a pixmap of an explosion 184 which is currently under construction.

During a flip operation, the display device interface exchanges the underlying surface memory. It accomplishes this exchange by updating the reference pointers in the overlay surface structures 170, 172 as shown in FIG. 5. After the flip, the overlay surface structure for the front buffer has a reference pointer 178 to the surface memory 182 holding the completed pixmap of the explosion. The surface structure for the back buffer has a reference pointer to the surface memory 180 that previously held the pixmap of the monster. FIG. 5 shows this region of surface memory with an "X" through it to represent that the memory is now scratch memory. After the flip, the client display controller generates the display screen from the pixmap in the front buffer surface memory 182 and the pixmap in the primary surface memory 152. The display controller superimposes the pixmap of the explosion into the area allocated to the game applications window in the primary surface. The resulting display image 186 appears as shown in FIG. 5.

FIG. 7 shows how the overlay surface 200 representing the monster is superimposed on the area 202 of the primary surface 204 allocated for the game application's window.

To illustrate the flip operation, we describe it in the context of the steps performed by the game application during normal operation as shown in FIG. 6. In general, the game collects input, computes changes to the display image based on this input, and renders a new surface. The game then requests a flip operation to make the next frame visible on the display screen. The display device interface manages the overlay surfaces in the flipping structure, and controls the flipping of the overlay surfaces.

To begin the process of generating the next frame, the application gathers the input from an input device such as a mouse, keyboard, joystick, etc. as shown in step 220 of FIG. 6. In the Windows® operating system, the application can respond to input by gathering WM_MOUSEMOVE and WM_KEYXXX messages. In the alternative, the application can directly ask an input device for its current position through the device driver of the input device.

The application also determines whether the size and position of the window has changed 222. In response, the application updates the size of the overlay with the new size and/or position of the overlay surface. The display device interface includes a function to update the overlay, which it uses to change the position of the overlay, and a function to set the overlay's position, which it uses to change the position of the overlay relative to the upper left hand corner of the primary surface. The application also makes sure the color key for its window is updated for the new size or position. If the application used GDI to set the color key, it would use GDI to update the color key for the new window size or position. If the application used the display device interface to fill its window with the color key, it would use the display device interface to update the color key.

The next step 224 shown in FIG. 6 is to process the input and compute the outcome. For instance, in the example in FIG. 5 the user has entered an input or series of inputs that destroy the monster. As such, the application determines that it needs to construct an overlay surface depicting the explosion of the monster.

To accomplish this, the application renders the overlay surface showing the explosion to the back buffer as depicted in the surface memory 182 (step 226 in FIG. 6). This can include copying the overlay surface from another offscreen surface or from several offscreen surfaces. As it renders the explosion, the application can invoke functions in the display interface to gain access to the back buffer and to manipulate the pixel values store in it. When the application has finished rendering the overlay surface in the back buffer, it is ready to invoke the flip operation.

Next, the application calls the flip function for the flipping surface representing the overlay surfaces 228. In response the display device interface exchanges the front and back buffers as shown in FIG. 5.

After the flip, the display hardware superimposes the overlay surface in the front buffer on the primary surface. The display device interface manages access to the front buffer by specifying to the hardware where the front buffer is located in video memory. The overlay flipping structure stores memory pointers to the video memory allocated to the overlay surfaces (front and back buffers). When the interface performs a flip, it writes the address of the overlay surface that is about to become the front buffer to an overlay register in the display controller. The overlay register is a register that stores the location of an overlay to be superimposed by the overlay control onto the display image.

As the process of generating a display image continues, the application renders its next display to the back buffer of the overlay flipping structure. The flip operation manages the underlying surface memory by keeping track of which memory regions currently serve as the front and back buffers.

The support for flipping in a window using overlays can be implemented in a variety of ways. Below, we describe one implementation of the display device interface, which is based on an object-oriented programming methodology.

In one embodiment, the display device interface shown in FIG. 2 is implemented as an object that represents the underlying display device hardware. When we refer to an "object" in this context, we are referring to an object as used in the context of object-oriented programming. There can be one instance of a display device object for every logical display device in operation. For example, a software development environment may have two monitors, one running a game using the display device interface shown in FIG. 2, and another running the development environment using an alternative display device interface such as GDI (the graphics device interface), which is part of the Windows® 95 operating system from Microsoft Corporation.

The display device object in this particular architecture owns all of the global attributes of the display device (e.g. video card) that it represents. It controls default values for the global attributes such as the color key values, color depth, resolution and the hardware's display mode. As explained further below, it also can control a default color table or palette for the primary surface.

In this implementation of the display device interface, the display device object includes a number of member functions to create additional objects, which provide services through their respective member functions. These objects include a surface object, a palette object, and a clipper object.

A surface object is a specific way to implement the surface structures described above. A surface object, therefore, represents a region in memory that holds a pixmap, an alpha buffer, or a Z buffer, for example. The member functions of the surface object provides services for managing and manipulating surfaces. As explained in further detail below, these services include functions to flip surfaces, attach or detach a surface, perform a bit block transfer, list surfaces attached to a given surface, return capabilities of the surface, return the clipper object attached to the surface, etc.

A palette object is an object that represents a color table. Through a palette object, an application can gain access to and manipulate the color table of the display device. A palette object allows direct manipulation of the palette table as a table. This table can have 16 or 24 bit RGB entries representing the colors associated with each of the indexes or, for 16 color palettes, it can also contain indexes to another 256 color palette. Entries in these tables can be retrieved with a get entries member function and changed with set entries member function.

In this implementation, a palette object becomes associated with a surface object when attached to it. Palette objects can be attached to the pixmap surfaces described above such as the primary surface, an offscreen surface, a texture map, and an overlay. Each of the palette objects attached to these surfaces can be different.

One embodiment of the display device interface simplifies color specification for surfaces by supporting default palettes. If a surface object does not have an attached palette, it automatically defaults to the palette of the primary surface. In this architecture, the display device object controls the default palette.

The clipper objects represent clip lists. A clipper object can be attached to any surface. In one implementation of the display device interface for a windowing environment, a window handle can be attached to a clipper object. Using the information provided by the window handle, the display device interface can update the clip list of the clipper object with the clip list of the window as the clip list for the window changes.

In order to create a surface, palette or clipper object, the application first creates an instance of a display device object. The application can then create one of these objects by invoking one of the display device object's member functions to create the object.

Figure 8:
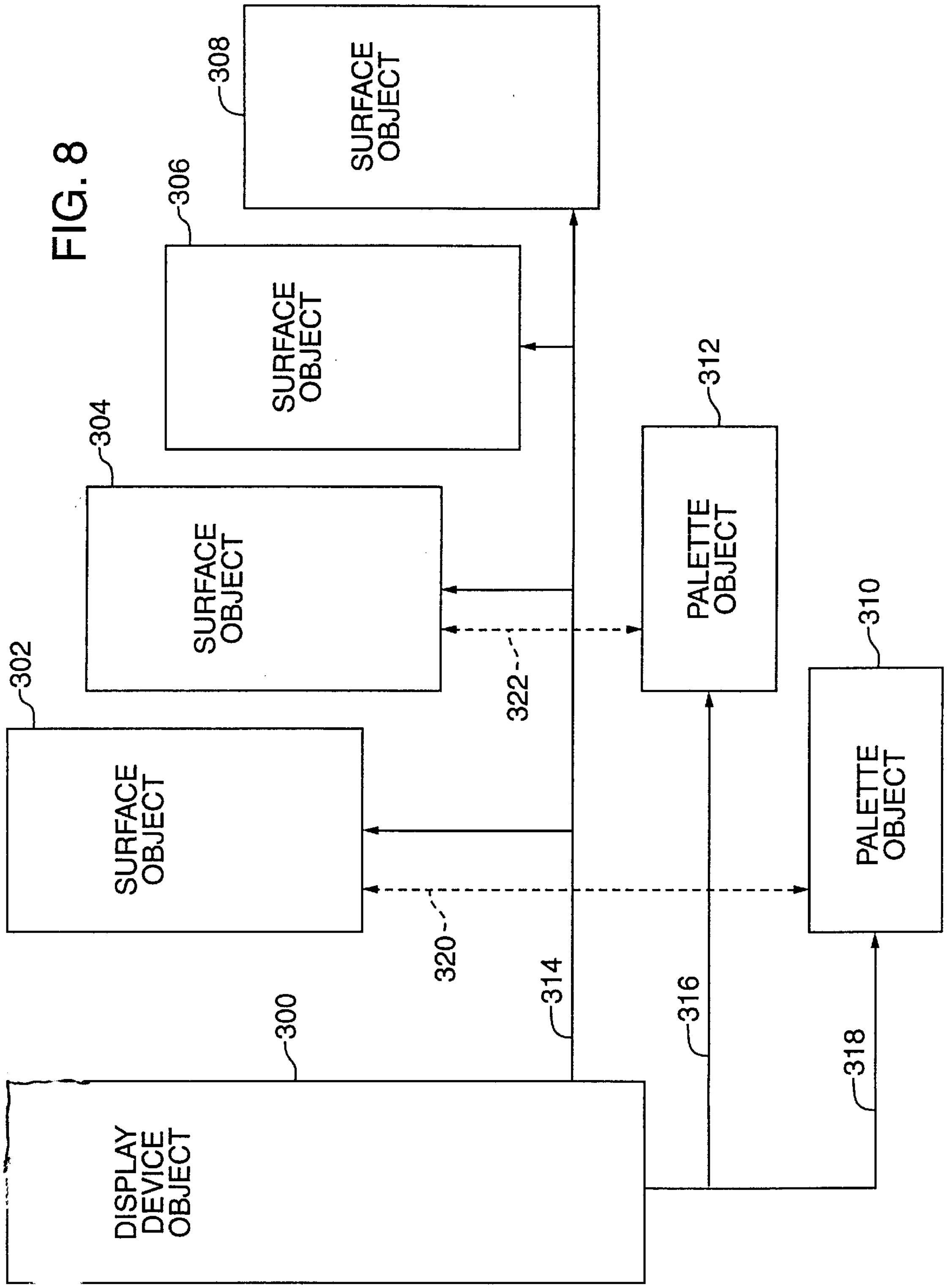
FIG. 8 is a block diagram illustrating the object architecture of an implementation of a display device interface.

FIG. 8 is a block diagram illustrating the object architecture in one embodiment. The display device object 300 for a display device is the creator and owner of the surface objects 302–308 and palette objects 310–312 for that display device. It is responsible for managing all of the objects that it creates. This ownership relationship is represented by the solid arrows 314, 316, 318 from the display device object 300 to its surface objects 302–308 and palette objects 310–312. The palette objects 310–312 are attached to associated surface objects via attachment links 320, 322.

To create a surface object in this architecture, the application calls the display device object's "create surface" member function. In response, the CreateSurface member function creates a surface object that represents a surface and the underlying surface memory that holds it. The member function creates a surface object with the attributes and capabilities specified by the application. If the application requests a complex surface (a surface structure including more than one surface), then the member function in this implementation creates instances of surface objects for each surface.

The application can specify the attributes of the surface object by setting fields in a surface description structure that it passes to the create surface member function. One implementation of this structure and a description of its fields is set forth below:

```
typedef struct_DDSURFACEDESC {
    DWORD       dwSize;
    DWORD       dwFlags;
    DWORD       dwHeight;
    DWORD       dwWidth;
    LONG        lPitch;
    union
    {
        DWORD       dwBackBufferCount;
        DWORD       dwMipMapCount;
    }
    DWORD       dwZBufferBitDepth;
    DWORD       dwAlphaBitDepth;
    DWORD       dwReserved;
    LPVOID      lpSurface;
    DDCOLORKEY      ddckCKDestOverlay;
    DDCOLORKEY      ddckCKDestBlt;
    DDCOLORKEY      ddckCKSrcOverlay;
    DDCOLORKEY      ddckCKSrcBlt;
    DDPIXELFORMAT       ddpfPixelFormat;
    DDSCAPS     ddsCaps;
} DDSURFACEDESC, FAR*LPDDSURFACEDESC;.
dwSize
    Size of the structure. Initialized prior to use.
dwFlags
    DDSD_CAPS       ddsCaps field is valid.
    DDSD_HEIGHT     dwHeight field is valid.
    DDSD_WIDTH      dwWidth field is valid.
    DDSD_PITCH      lPitch is valid.
    DDSD_BACKBUFFERCOUNT        dwBackBufferCount is valid.
    DDSD_ZBUFFERBITDEPTH        dwZBufferBitDepth is valid.
    DDSD_ALPHABITDEPTH      dwAlphaBitDepth is valid.
    DDSD_LPSURFACE      lpSurface is valid.
    DDSD_PIXELFORMAT        ddpfPixelFormat is valid.
    DDSD_CKDESTOVERLAY      ddckCKDestOverlay is valid.
```

-continued

```
    DDSD_CKDESTBLT      ddckCKDestBlt is valid.
    DDSD_CKSRCOVERLAY       ddckCKSrcOverlay is valid.
    DDSD_CKSRCBLT       ddckCKSrcBlt is valid.
    DDSD_ALL        All input fields are valid.
dwHeight
    Height of surface.
dwWidth;
    Width of input surface.
lPitch
    Distance to start of next line (return value only).
dwBackBufferCount
    Number of back buffers.
dwMipMapCount
    Number of mip-map levels.
dwZBufferBitDepth
    Depth of Z buffer.
dwAlphaBitDepth
    Depth of alpha buffer.
dwReserved
    Reserved.
lpSurface
    Pointer to the associated surface memory.
ddckCKDestOverlay
    Color key for destination overlay use.
ddckCKDestBlt
    Color key for destination blit use.
ddckCKSrcOverlay
    Color key for source overlay use.
ddckCKSrcBlt
    Color key for source blit use.
ddpfPixelFormat
    Pixel format description of the surface.
ddsCaps
    Surface capabilities.
```

The surface object maintains a list of its capabilities in a surface capabilities structure. As shown in the implementation above, this structure is part of the surface description structure. One implementation of the surface capabilities and a description of its fields follows below:

```
typedef struct_DDSCAPS {
    DWORD       dwCaps;
} DDSCAPS, FAR* LPDDSCAPS;
dwCaps
```

DDSCAPS_3D

Indicates that this surface is a front buffer, back buffer, or texture map that is being used in conjunction with a 3D rendering system.

DDSCAPS_ALPHA

Indicates that this surface contains alpha information. The pixel format must be interrogated to determine whether this surface contains only alpha information or alpha information interlaced with pixel color data (e.g. RGBA or YUVA).

DDSCAPS_BACKBUFFER

Indicates that this surface is a backbuffer. It is generally set by the create surface function when the DDSCAPS_FLIP capability bit is set. It indicates that this surface is THE back buffer of a surface flipping structure.

DirectDraw supports N surfaces in a surface flipping structure. Only the surface that immediately precedes the DDSCAPS_FRONTBUFFER has this capability bit set. The other surfaces are identified as back buffers by the presence of the DDSCAPS_FLIP capability, their attachment order, and the absence of the DDSCAPS_FRONTBUFFER and DDSCAPS_BACKBUFFER capabilities. The bit is sent to the create surface function when a stand-alone back buffer is being created. This surface could be attached to a front buffer and/or back buffers to form a flipping surface structure after the call to the create surface function.

DDSCAPS_COMPLEX

Indicates a complex surface structure is being described. A complex surface structure results in the creation of more than one surface. The additional surfaces are attached to the root surface. The complex structure can only be destroyed by destroying the root.

DDSCAPS_FLIP

Indicates that this surface is a part of a surface flipping structure. When it is passed to create surface function, the DDSCAPS_FRONTBUFFER and DDSCAPS_BACKBUFFER bits are not set. They are set by the create surface function on the resulting creations. The dwBackBufferCount field in the DDSURFACEDESC structure must be set to at least 1 in order for the create surface function call to succeed. The DDSCAPS_COMPLEX capability must always be set when creating multiple surfaces through create surface function.

DDSCAPS_FRONTBUFFER

Indicates that this surface is THE front buffer of a surface flipping structure. It is generally set by create surface function when the DDSCAPS_FLIP capability bit is set. If this capability is sent to the create surface function, then a stand-alone front buffer is created. This surface will not have the DDSCAPS_FLIP capability. It can be attached to other back buffers to form a flipping structure.

DDSCAPS_HWCODEC

Indicates surface should be able to have a stream decompressed to it by the hardware.

DDSCAPS_LIVEVIDEO

Indicates surface should be able to receive live video.

DDSCAPS_MODEX

Surface is a 320×200 or 320×240 ModeX surface.

DDSCAPS_OFFSCREENPLAIN

Indicates that this surface is any offscreen surface that is not an overlay, texture, Z buffer, front buffer, back buffer, or alpha surface.

DDSCAPS_OWNDC

Indicates surface will have a DC associated long term.

DDSCAPS_OVERLAY

Indicates that this surface is an overlay. It may or may not be directly visible depending on whether or not it is currently being overlayed onto the primary surface. DDSCAPS_VISIBLE can be used to determine whether or not it is being overlayed at the moment.

DDSCAPS_PALETTE

Indicates that unique palette objects can be created and attached to this surface.

DDSCAPS_PRIMARYSURFACE

Indicates that this surface is the primary surface. The primary surface represents what the user is seeing at the moment.

DDSCAPS_PRIMARYSURFACELEFT

Indicates that this surface is the primary surface for the left eye. The primary surface for the left eye represents what the user is seeing at the moment with the user's left eye. When this surface is created the DDSCAPS_PRIMARYSURFACE represents what the user is seeing with the user's right eye.

DDSCAPS_SYSTEMMEMORY

Indicates that this surface memory was allocated in system memory.

DDSCAPS_TEXTURE

Indicates that this surface can be used as a 3D texture. It does not indicate whether or not the surface is being used for that purpose.

DDSCAPS_VIDEOMEMORY

Indicates that this surface exists in video memory.

DDSCAPS_VISIBLE

Indicates that changes made to this surface are immediately visible. It is always set for the primary surface and is set for overlays while they are being overlayed and texture maps while they are being textured.

DDSCAPS_WRITEONLY

Indicates that only writes are permitted to the surface. Read accesses from the surface may or may not generate a protection fault, but the results of a read from this surface will not be meaningful.

DDSCAPS_ZBUFFER

Indicates that this surface is the Z buffer. The Z buffer does not contain displayable information. Instead, it contains bit depth information that is used to determine which pixels are visible and which are obscured.

The create surface function can be used to create a variety of different surface structures. One example, as explained generally above, is a primary surface. When an application requests the interface to create a primary surface in this implementation, the interface creates a surface object to access the surface memory currently being used to generate the display image. This enables the application to access surface memory that is already being used by another process in the computer. For example in the context of a computer running the Windows Operating System, GDI may currently be using this surface memory to control the display. To create a primary surface in this example, the application fills in the relevant fields of the surface description structure passed to the interface on the create surface function call.

The application would fill in the fields of the surface description structure as follows:

```
DDSURFACEDESC    ddsd;
ddsd.dwSize = sizeof(ddsd);
//Tell DDRAW which fields are valid
ddsd.dwFlags = DDSD_CAPS;
//Ask for a primary surface
ddsd.ddsCaps.dwCaps = DDSCAPS_PRIMARYSURFACE;
```

As another example, an application can create a plain, offscreen surface. An offscreen surface can be used to store pixmaps that will be combined with other surfaces in the video card, for example. In requesting the interface to create this surface, the application might fill in the surface description structure as follows:

```
DDSURFACEDESC    ddsd;
ddsd.dwSize = sizeof(ddsd);
//Tell DDRAW which fields are valid
ddsd.dwFlags = DDSD_CAPS | DDSD_HEIGHT | DDSD_WIDTH;
//Ask for a simple offscreen surface, sized 100 by 100 pixels
ddsd.ddsCaps.dwCaps = DDSCAPS_OFFSCREENPLAIN;
dwHeight = 100;
dwWidth = 100;
```

In this implementation, the interface attempts to create this offscreen surface in video memory, and if there is not enough memory, it uses system memory.

The create surface function can be used to create a complex surface structure in a single function call. If the DDSCAPS_COMPLEX flag is set in the create surface call, one or more "implicit" surfaces will be created by the interface in addition to the surface explicitly specified. Complex Surfaces are managed as a single surface in this implementation. For example, a single call to release a complex surface will release all surfaces in the structure, and a single call to restore a surface will restore them all.

One example of a complex surface structure in this implementation is a surface structure that represents an overlay surface and one or more back buffers that form a surface flipping environment. The fields in the DDSURFACEDESC structure, ddsd below, relevant to complex surface creation are filled in to describe a flipping surface that has one back buffer.

```
    DDSURFACEDESC    ddsd;
    ddsd.dwSize = sizeof(ddsd);
    //Tell DDRAW which fields are valid
    ddsd.dwFlags = DDSD_CAPS | DDSD_BACKBUFFERCOUNT;
    //Ask for a overlay surface with a single back buffer
    ddsd.ddsCaps.dwCaps =
    DDSCAPS_COMPLEX | DDSCAPS_FLIP |
DDSCAPS_OVERLAY;
    ddsd.dwBackBufferCount = 1;
```

The statements in the example above construct a double-buffered flipping environment. A single call to a flip function in the display device interface exchanges the surface memory of the front and the back buffer of the overlay flipping structure. If a BackBufferCount of "2" had been specified, two back buffers would have been created, and each call to the flip function would have rotated the surfaces in a circular pattern, providing a triple buffered flipping environment.

To support flipping in a window in this implementation, an application invokes the create surface member function to create an overlay flipping structure to represent overlay surfaces and a primary surface object representing the frame buffer. The application sets the color key of the overlay by invoking a member function of the surface object used to set the color key. In addition, the application fills its window with the color of the color key. To accomplish this, the application can use GDI to fill the window with the color of the color key or it can use a blt member function of the surface object with a color fill option set.

During runtime, the application collects input, processes it, and renders its display image to the back buffer of the overlay flipping structure. In cases where its window changes position or size, it uses member functions of the surface object to change the size and position of the overlay relative to the upper left hand corner of the primary surface.

To manipulate the surface in the back buffer of the overlay flipping structure, the application can invoke a lock member function to get direct access to the surface memory. The application can perform bit block transfers (Blts) to the back buffer using the blt member function. These member functions are described in more detail in co-pending application, entitled Display Device Interface Including Support for Generalized Flipping of Surfaces by Craig G. Eisler and G. Eric Engstrom, filed on Apr. 25, 1996, which is incorporated by reference.

After rendering its image to the back buffer, the application request a flip (invokes the flip member function) for the overlay flipping structure. The details of one implementation of the flip function are provided later in this description.

Following below are examples of overlay functions used to control overlay surface objects in one implementation. An application uses the update overlay function to update the size of the window, and the SetOverlay function to change the position of the overlay relative to the upper left hand corner of the primary surface.

An application uses the SetColorKey function to set the colorkey for its window. As noted above, GDI can be used in the alternative to set the color key and update it when the window changes size or position.

UpdateOverlay

```
HRESULT UpdateOverlay(LPRECT lpSrcRect,
    LPDIRECTDRAWSURFACE lpDDDestSurface,
    LPRECT lpDestRect, DWORD dwFlags,
    LPDDOVERLAYFX lpDDOverlayFx);
```

Repositions or modifies the visual attributes of an overlay surface. These surfaces must have the DDSCAPS_OVERLAY value set.

Returns DD_OK if successful, or one of the following error values otherwise:

| | |
|---|---|
| DDERR_GENERIC | DDERR_HEIGHTALIGN |
| DDERR_INVALIDOBJECT | DDERR_INVALIDPARAMS |
| DDERR_INVALIDRECT | DDERR_INVALIDSURFACETYPE |
| DDERR_NOSTRETCHHW | DDERR_NOTAOVERLAYSURFACE |
| DDERR_SURFACELOST | DDERR_UNSUPPORTED |
| DDERR_XALIGN | |

lpSrcRect

Address of a RECT structure that defines the x, y, width, and height of the region on the source surface being used as the overlay.

lpDDDestSurface

Address of the Surface structure that represents the surface. This is the surface that is being overlayed.

lpDestRect

Address of a RECT structure that defines the x, y, width, and height of the region on the destination surface that the overlay should be moved to.

dwFlags

DDOVER_ADDDIRTYRECT

Adds a dirty rectangle to an emulated overlayed surface.

DDOVER_ALPHADEST

Uses the alpha information in pixel format or the alpha channel surface attached to the destination surface as the alpha channel for the destination overlay.

DDOVER_ALPHADESTCONSTOVERRIDE

Uses the dwAlphaDestConst member in the DDOVERLAYFX structure as the destination alpha channel for this overlay.

DDOVER_ALPHADESTNEG

The NEG suffix indicates that the destination surface becomes more transparent as the alpha value increases. (0 is opaque).

DDOVER_ALPHADESTSURFACEOVERRIDE

Uses the lpDDSAlphaDest member in the DDOVERLAYFX structure as the alpha channel destination for this overlay.

DDOVER_ALPHAEDGEBLEND

Uses the dwAlphaEdgeBlend member in the DDOVERLAYFX structure as the alpha channel for the edges of the image that border the color key colors.

DDOVER_ALPHASRC

Uses the alpha information in pixel format or the alpha channel surface attached to the source surface as the source alpha channel for this overlay.

DDOVER_ALPHASRCCONSTOVERRIDE

Uses the dwAlphaSrcConst member in the DDOVERLAYFX structure as the source alpha channel for this overlay.

DDOVER_ALPHASRCNEG

The NEG suffix indicates that the source surface becomes more transparent as the alpha value increases.

DDOVER_ALPHASRCSURFACEOVERRIDE

Uses the lpDDSAlphaSrc member in the DDOVERLAYFX structure as the alpha channel source for this overlay.

DDOVER_DDFX
Uses the overlay FX flags to define special overlay FX.
DDOVER_HIDE
Turns this overlay off.
DDOVER_KEYDEST
Uses the color key associated with the destination surface.
DDOVER_KEYDESTOVERRIDE
Uses the dckDestColorkey member in the DDOVERLAYFX structure as the color key for the destination surface.
DDOVER_KEYSRC
Uses the color key associated with the source surface.
DDOVER_KEYSRCOVERRIDE
Uses the dckSrcColorkey member in the DDOVERLAYFX structure as the color key for the source surface.
DDOVER_SHOW
Turns this overlay on.
DDOVER_ZORDER
Uses the dwZOrderFlags member in the DDOVERLAYFX structure as the z-order for the display of this overlay. The lpDDSRelative member will be used if the dwZOrderFlags member is set to either DDOVERZ_INSERTINBACKOF or DDOVERZ_INSERTINFRONTOF.
lpDDOverlayFx
See the DDOVERLAYFX structure.
SetOverlayPosition
HRESULT SetOverlayPosition(LONG 1X, LONG 1Y);
Changes the display coordinates of an overlay surface.
Returns DD_OK if successful, or one of the following error values otherwise:

| | |
|---|---|
| DDERR_GENERIC | DDERR_INVALIDOBJECT |
| DDERR_INVALIDPARAMS | DDERR_SURFACELOST |
| DDERR_UNSUPPORTED | |
| lX | |
| New x-display coordinate. | |
| lY | |
| New y-display coordinate. | |

DDOVERLAYFX

```
typedef struct_DDOVERLAYFX{
    DWORD dwSize;
    DWORD dwAlphaEdgeBlendBitDepth;
    DWORD dwAlphaEdgeBlend;
    DWORD dwReserved;
    DWORD dwAlphaDestConstBitDepth;
union
{
    DWORD            dwAlphaDestConst;
    LPDIRECTDRAWSURFACE lpDDSAlphaDest;
};
    DWORD dwAlpbaSrcConstBitDepth;
union
{
    DWORD            dwAlphaSrcConst;
    LPDIRECTDRAWSURFACE lpDDSAlphaSrc;
};
    DDCOLORKEY dckDestColorkey;
    DDCOLORKEY dckSrcColorkey;
    DWORD       dwDDFX;
    DWORD       dwFlags;
}DDOVERLAYFX,FAR *LPDDOVERLAYFX;
```

Passes override information to the UpdateOverlay method.
dwSize
Size of the structure. This must be initialized before the structure is used.
dwAlphaEdgeBlendBitDepth
Bit depth used to specify the constant for an alpha edge blend.
dwAlphaEdgeBlend
Constant to use as the alpha for an edge blend.
dwReserved
Reserved for future use.
dwAlphaDestConstBitDepth
Bit depth used to specify the alpha constant for a destination.
dwAlphaDestConst
Constant to use as the alpha channel for a destination.
lpDDSAlphaDest
Address of a surface to use as the alpha channel for a destination.
dwAlphaSrcConstBitDepth
Bit depth used to specify the alpha constant for a source.
dwAlphaSrcConst
Constant to use as the alpha channel for a source.
lpDDSAlphaSrc
Address of a surface to use as the alpha channel for a source.
dckDestColorkey
Destination color key override.
dckSrcColorkey
Source color key override.
dwDDFX
Overlay FX Flags
DDOVERFX_ARITHSTRETCHY
If stretching, use arithmetic stretching along the y-axis for this overlay.
DDOVERFX_MIRRORLEFTRIGHT
Mirror the overlay around the vertical axis.
DDOVERFX_MIRRORUPDOWN
Mirror the overlay around the horizontal axis.
dwFlags
This parameter is not used at this time and must be set to 0.
SetColorKey
HRESULT SetColorKey(DWORD dwFlags, LPDDCOLORKEY lpDDColorKey);
Sets the color key value for the surface object if the hardware supports color keys on a per surface basis.
Returns DD_OK is successful, or one of the following error values otherwise:

| | |
|---|---|
| DDERR_GENERIC | DDERR_INVALIDOBJECT |
| DDERR_INVALIDPARAMS | DDERR_INVALIDSURFACETYPE |
| DDERR_NOOVERLAYHW | DDERR_NOTAOVERLAYSURFACE |
| DDERR_SURFACELOST | DDERR_UNSUPPORTED |
| DDERR_WASSTILL-DRAWING | |

dwFlags
Determines which color key is requested.
DDCKEY_COLORSPACE
Set if the structure contains a colorspace. Not set if the structure contains a single color key.
DDCKEY_DESTBLT
Set if the structure specifies a color key or color space to be used as a destination color key for blit operations.
DDCKEY_DESTOVERLAY
Set if the structure specifies a color key or color space to be used as a destination color key for overlay operations.
DDCKEY_SRCBLT
Set if the structure specifies a color key or color space to be used as a source color key for blit operations.
DDCKEY_SRCOVERLAY
Set if the structure specifies a color key or color space to be used as a source color key for overlay operations.

lpDDColorKey

Address of the DDCOLORKEY structure that has the new color key values for the surface object.

As set forth above, the display device interface is responsible for controlling access to surface memory, including surface memory for storing overlays. When an application makes a call to modify a surface, for example, the display device interface makes sure that it is safe to modify the underlying surface memory. For the sake of clarity, we use the example of an application requesting access to a surface, but the same issues arise with respect to other producers or clients of a surface structure. In general a producer is an entity in the system that is writing to a surface, while a client is an entity that is reading from a surface. When we refer to the display device interface in this context, we are referring generally to the display device interface and/or the HAL as shown in FIG. 2.

The method for managing access to a surface can be broken into a variety of different cases depending on the operation being performed and the type of surface structure involved. In the case of flipping, the way in which the interface manages access to surface memory can be classified into two classes: 1) where the lipping structure represents an on screen (visible on monitor) surface such as the primary surface or a visible overlay surface, and 2) an off screen surface.

In the first case, the display interface checks whether an application has locked or is biting to either the target or source surface memory before trying to process a new flip request. In addition, the display interface determines whether the display controller has completed any flip already in progress. As explained in further detail below, this basically means that the display controller has finished reading a display address register containing the memory location of the next front buffer and as a result will be making no further accesses to the previous front buffer. While processing a flip request, the display interface also prevents bits or locks to the target surface memory before the flip request is has been completely processed.

In the second case, the flip control also checks whether an application has locked or is biting to either the target or source surface memory before trying to process a new flip request. However, since a hardware page flip is not involved, the flip control does not have to ensure that the display controller has completed a previous page flip request.

In the case of a request for a bit, lock, or some other call to access a surface, the interface determines whether it is safe to access the surface. The interface checks whether a flip is currently in progress involving the surface or surfaces of interest, and also checks whether another application has locked or is biting to the surface.

With the above introduction, we now discuss the case of flipping visible surfaces in more detail. Before successfully completing a flip, it is sometimes necessary to check whether the display controller has completed the last flip to avoid generating anomalies (causing tearing) in the display image. For example, this is necessary when an application requests a flip of the front and back buffers in an overlay flipping structure to ensure that the application does not begin writing to a buffer that the display device is still reading. It is also necessary when an application attempts to modify surface memory through a bit block transfer or lock request before the display controller completes a flip.

In the case of an overlay flipping structure with a front and two or more back buffers, it is usually safe to begin drawing to one of the back buffers because there is at least one extra buffer that the application can modify. For instance if there are two back buffers, the memory region used as the front buffer can be cycled to one back buffer and the application can draw to the other back buffer. A conflict can arise, however, where the application requests two flips in less than the refresh time of the monitor. In these circumstances, it is still necessary to prevent an application from using the surface memory that the display controller is currently reading.

To avoid modifying surface memory that the display controller is reading, the display device interface (or its HAL) checks the state of the display hardware before attempting operations that could cause a conflict such as a flip, a blt, or a request to lock a surface. In the case of a flip operation on a visible flipping structure, it is important to determine whether it is safe to change the address of the surface memory region that is currently serving as the front buffer.

Figure 9:
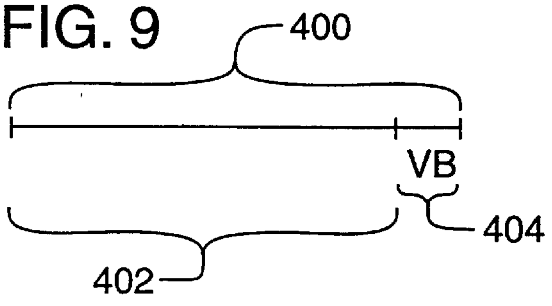
FIG. 9 is a diagram illustrating the refresh period of a display device to help illustrate flipping control.

Before describing how the flip operation in more detail, we begin by illustrating the behavior of typical display controller. FIG. 9 illustrates the refresh period of a typical display controller. The time line represents the entire refresh period 400 of the display. Most display controllers available today have a refresh rate of at least 60 Hz and typically are at or greater than 72 Hz. The first section of the refresh period shown in FIG. 9 represents the scan period 402 when the monitor scans across horizontal scan lines to display the primary surface. The second section represents the vertical blank period (VB or VBL) 404.

In many of the display devices, the display controller reads the address of the next display image and any overlay during the vertical blank time 404. Once it has read the addresses, the display hardware can then start to display the next display image. The display device driver (IAL, for example) changes the address of the frame buffer or of an overlay, which in effect, instructs the display controller to scan the display image or overlay from another region in video memory. Unfortunately, most display hardware does not specify explicitly when it is safe to draw to a back buffer, or in other words, when it has completed reading these addresses. As such, the display device interface (in conjunction with the HAL or display driver on the host PC) has to determine when it is safe to: 1) modify a back buffer in response to a flip, blt, or lock request; and 2) in the case of a flip request, alter the display address.

The display device interface and associated device driver (HAL) control access to surface memory after a flip. For the purposes of this description we refer explicitly to the driver; however, the specific architecture of the interface and river can vary.

Figure 10:
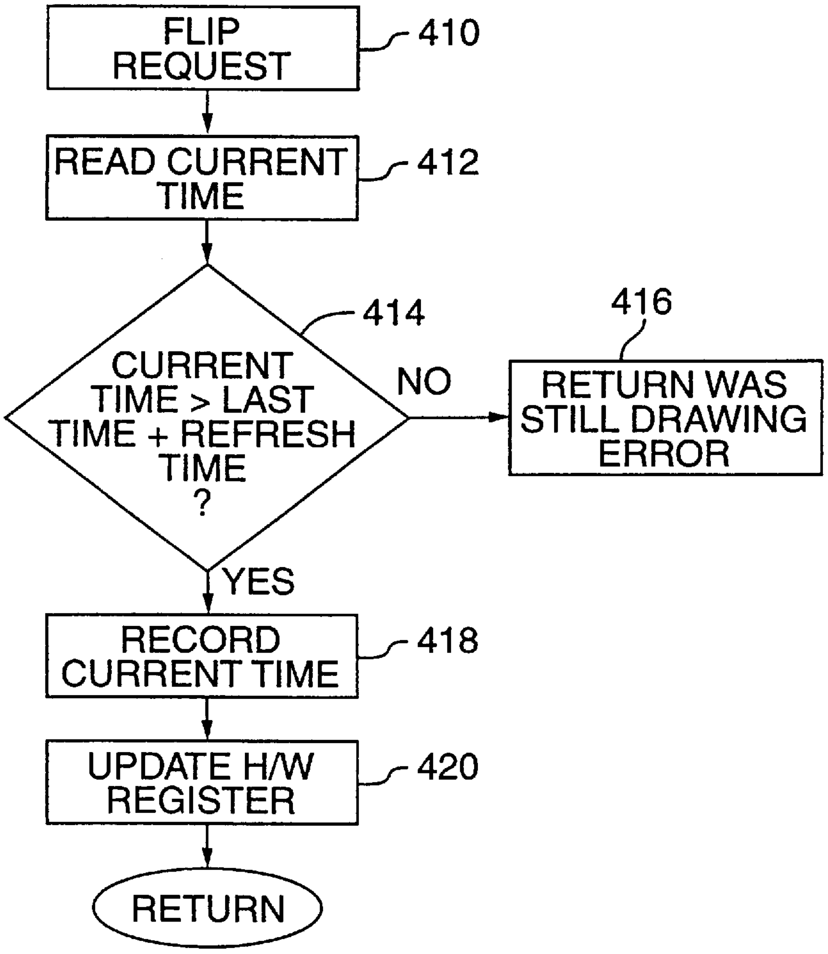
FIG. 10 is a flow diagram illustrating a method for controlling a flip operation.

FIG. 10 is a flow diagram illustrating one possible example of controlling a flip in response to a flip request. The first step 410 represents the flip request of a visible surface (overlay, primary, etc.). In response, the driver reads the current time from a time resource in the computer (412). This time resource can be a hardware or software timer or some other common time keeper found in a computer system.

Next, the driver compares the current time with the sum of the time of the last flip request and the refresh time (414). If an entire refresh period has not elapsed since the last flip request, it is not safe to change the state of the display controller. As such, the driver returns a "WasStillDrawing" error (416).

If a refresh period has elapsed since the last flip request, the driver records the current time of the flip request and proceeds to update the hardware register (418, and 420). Specifically, the driver writes the address of the surface memory of the new front buffer to the display address. At this point, the driver has successfully completed the flip and it returns.

Figure 11:
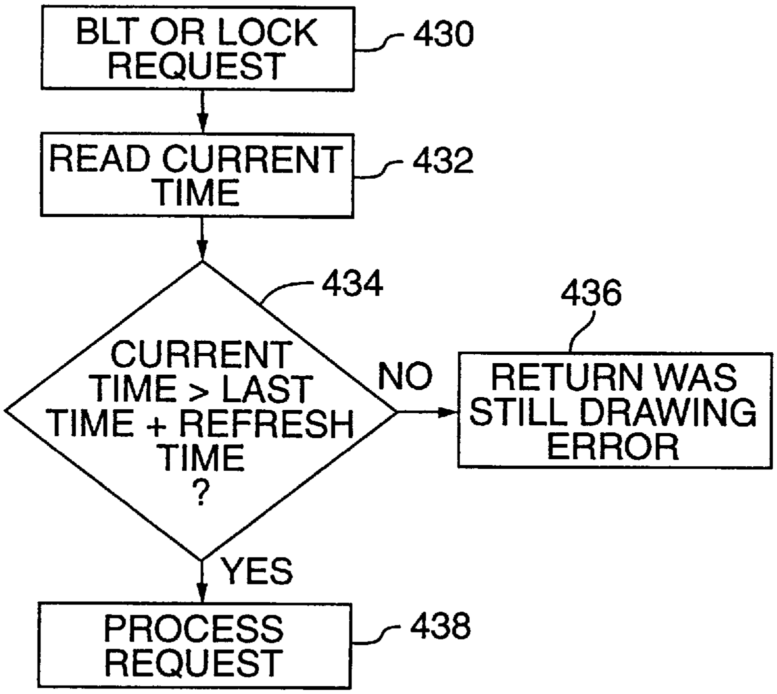
FIG. 11 is a diagram illustrating method for determining whether it is safe to modify a back buffer after a flip request.

A similar method can be used to determine whether to deny a blt or lock request after a flip. FIG. 11 is a flow diagram illustrating a similar method to determine whether the display device interface should return the "WasStill-Drawing" error in response to a blt or lock request. Steps 430–436 are the same steps as described above for FIG. 10. Specifically, the driver checks the current time and determines whether a refresh period has elapsed since the last flip. If not, the error is returned. Otherwise, the blt or lock operation proceeds.

In addition, or as an alternative to using the time of the last flip request, the driver can evaluate whether it is safe to complete a flip by determining if the display controller has moved outside the VB period since the last flip request. If the display controller is not in the VB period, but has entered it since the previous flip was initiated, it is safe to assume the flip has completed and the display address has been changed. If the display controller is in the VB period, it is not clear whether it is safe to complete the flip. In this case, another test such as the one illustrated in FIG. 10 can be used to evaluate whether to update the display address.

This particular use of the VBL is just one optimization in the flip operation. It can be exploited if the display controller provides information about whether it is in the VBL period.

Another optimization in the flip control is to read the scan line register, analyze the scan line position relative to the position when the last flip occurred. If the scan line is less than the scan line at the time the last flip occurred, then it is safe to assume the previous flip operation has completed and the display address has been changed.

Figure 12B:
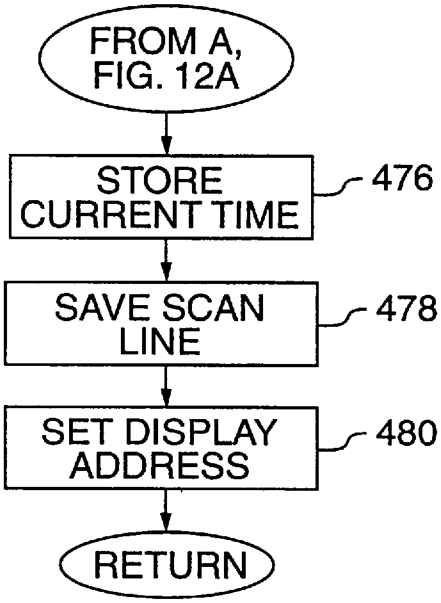
FIGS. 12A and 12B are a flow diagram illustrating another method for controlling a flip operation.
Figure 12A:
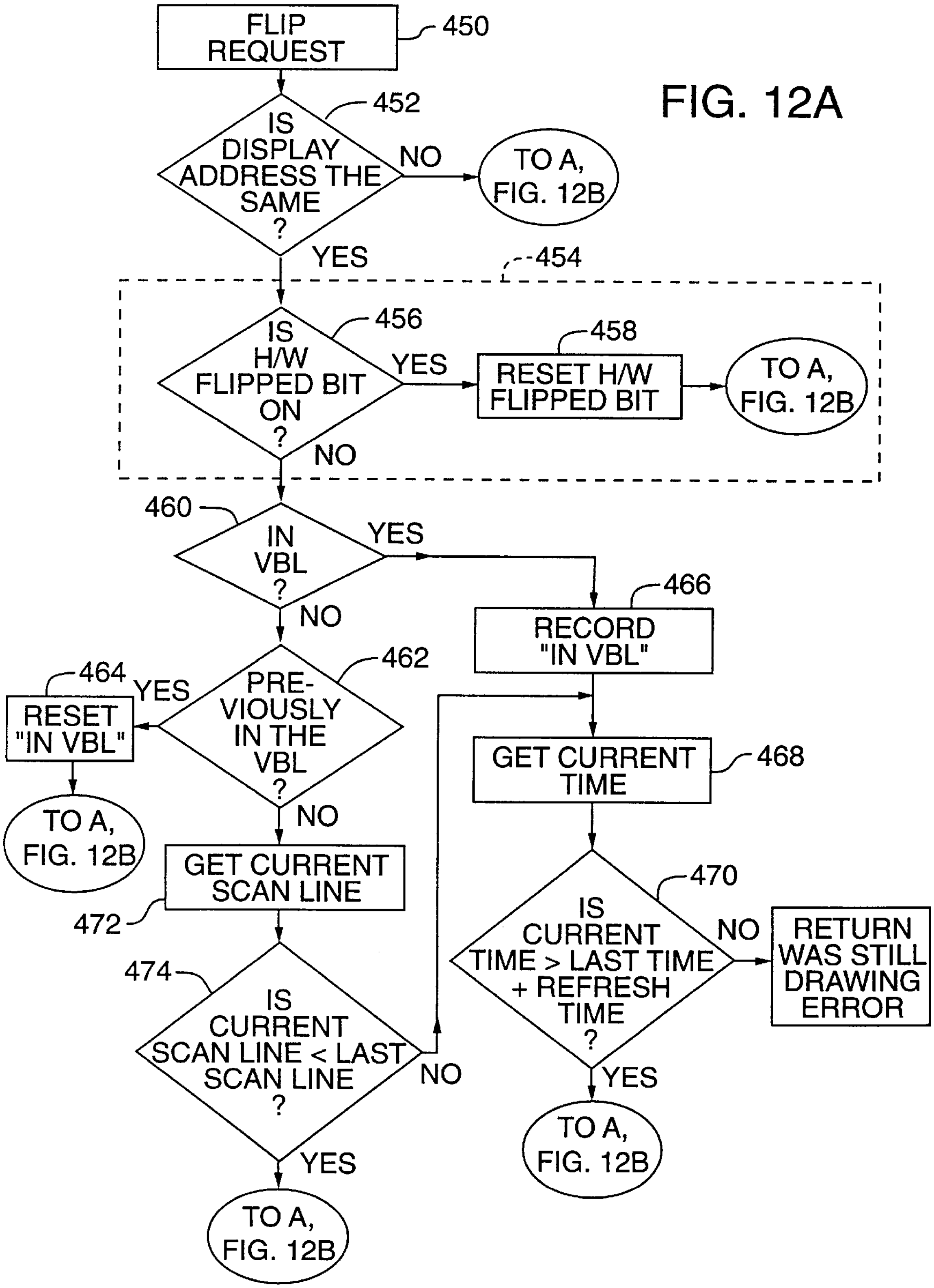

Illustrating these optimizations, FIGS. 12A and 12B are a flow chart of a specific implementation of the flip control. Beginning at the top of FIG. 12A, the method begins with a flip request (450). In response, the flip control proceeds with one or more checks to determine whether it should update the display address. The first check is to determine whether the display address as changed since the last flip request. The flip control reads the display address and determines whether it is the same as it was at the last flip request (452). If the display address has changed since the last flip request, then the display controller has performed a page flip, and it is safe to update the display address for the current flip request. The flip control method then proceeds as shown in FIG. 12B to record current parameters and update the display address.

Another check, shown in dashed lines (454) in FIG. 12A, is to check whether the hardware explicitly indicates that it has completed a page flip. This check is shown in dashed lines because it is only available if the display controller provides this information. In most display controllers, this information is not available, so the flip control performs alternative checks using information the display controller does provide, such as whether it is in a vertical blank period and the current position of the scan line. In this particular example, the flip control checks whether a "hardware flipped" bit is on (456). If so, it is safe to update the display address. In these circumstances, the flip control sets the "hardware flipped" bit and proceeds to the steps shown in FIG. 12B.

In the majority of cases where the display controller does not specify that it has completed a page flip explicitly, the flip control has to evaluate the state of the display controller in other ways. As introduced, another approach is to check whether the display controller has moved from the vertical blank period since the last flip request. As shown in step 460, the flip control checks whether the display controller is currently in the vertical blank. If it is not, but was in the VB period on the last flip request(462), then it is safe to update the display address. As such, the flip control resets a bit indicating that the display controller was in the VB period (464) and proceeds to the steps in FIG. 12B.

If the display controller is in the VB period at the current flip request, the flip control has to do more checking. First, it sets the bit indicating that the display controller is in the VB period (466) and then performs a check similar to the one shown in FIG. 10. Specifically, it checks whether a refresh period has elapsed since the last flip request (468, 470). To accomplish this, the flip control gets the current time and compares it with the sum of the last flip request time plus the refresh time. If a refresh time has elapsed, it is safe to update the display address. If not, the flip control returns the "WasStillDrawing" error.

Another way to check whether the display controller has completed a page flip is to evaluate the scan line position at the current time and at the time of the last flip request. This method is illustrated in FIG. 12A beginning at step 472. To summarize, this aspect of the flip control compares the value for the current scan line with the value of the scan line at the last flip request (472, 474). If the current value is less than the previous value, then the display controller has completed a page flip since the last flip request. If the current position of the scan line is below the previous position, then the scan line test is inconclusive, and the flip control proceeds with the time check starting at step 468.

When the flip control determines that it is safe to update the display or overlay address, it executes the steps (476–480) shown in FIG. 12B. In this specific implementation, the flip control records the current time (476) and scan line (478), and sets the display address to the address of the surface memory of the front buffer.

As illustrated above, the flip control can perform a variety of checks to determine when to update the display address or overlay address. In alternative implementations, the type of tests and the specific manner in which they are performed can vary. Though we have explained specific implementations in detail, we do not intend to limit the scope of our invention to these implementations.

For some display controls, additional processing may be required to ensure that the flip control writes the display address without conflicting with the display controller's use of that data. For instance, if the display address is stored in more than one register, it is possible that the flip control could write part of a new address in one register as the display controller reads the display address. In these circumstances, the display controller will look to an incorrect address in video memory to generate the next display image. In effect, the display address that the display controller actually reads is some combination of the previous and current display address, which obviously points to the wrong memory region. To avoid this problem, the flip control can avoid writing the display address during the vertical blank period, the period when the display controller may read the registers holding the display address. As another alternative, the display controller could set a flag when it has read the display register. This latter approach is similar to the approach in dashed lines in FIG. 12A, where the display controller sets a bit indicating that it has completed a page flip.

Having described and illustrated the principles of our invention with reference to a preferred embodiment and several alternative embodiments, it should be apparent that the invention can be modified in arrangement and detail without departing from its principles. Accordingly, we claim all modifications as may come within the scope and spirit of the following claims.

We claim:

1. In a computer system including a processor, system memory, video memory and a display controller for converting a pixmap in the video memory to a display image on a display monitor and for superimposing an image at an overlay address onto the display image, a method for flipping images in a window of the display image, the method comprising:

a) allocating a primary surface in the video memory;

b) allocating a front and back buffer in the video memory;

c) creating an overlay flipping structure including a front buffer structure and back buffer structure representing the front and back buffers, respectively;

d) storing memory locations of the front and back buffers in the front and back buffer structures, respectively;

e) controlling rendering of an overlay image into the back buffer;

in response to a request to flip the overlay flipping structure:

f) determining when to write the memory location of the back buffer into the overlay address of the display controller to avoid tearing of the overlay image;

g) writing the memory location of the back buffer into the overlay address; and h) updating the memory locations stored in the front and back buffer structures;

i) repeating at least steps e through h to display subsequent rendered overlays in the window.

2. The method of claim 1 further including:

setting a color key in the primary surface in an area bounded by the window.

3. The method of claim 1 further including:

monitoring size of the window in the display image; and updating size of the front and back buffers when the window changes size.

4. The method of claim 3 further including:

setting a color key in the area bounded by the window when the window changes size.

5. The method of claim 1 further including:

monitoring the position of the window in the display image; and updating position of the overlay image in the primary surface when the window changes position.

6. The method of claim 5 further including:

setting a color key in the area bounded by the window when the window changes position.

7. The method of claim 1 wherein step e includes receiving an Application Programming Interface (API) request from an application program in the computer to bit block transfer or lock a region in the back buffer; and in response, preventing another application from modifying the overlay image in the back buffer.

8. The method of claim 1 wherein step i comprises swapping the memory locations stored in the front and back buffer structures.

9. The method of claim 8 wherein the flip request comprises invoking a flip member function of the instance of the surface object; and wherein executing the flip request comprises executing steps f, g, and h.

10. The method of claim 1 further including:

creating a display device object representing the display controller; and wherein the step c comprises invoking a create surface member function of the display device object to create an instance of a surface object including the front and back buffer structures.

11. The method of claim 1 including:

in response to the request to flip the overlay flipping structure, determining whether an application is performing a bit block transfer to or has a lock for a memory region in either the front or back buffers.

12. The method of claim 1 including:

in response to the request to flip the overlay flipping structure, determining whether a previous request to flip the overlay flipping structure is complete.

13. The method of claim 12 including:

in response to the request to flip the overlay flipping structure, determining whether a refresh period has elapsed since the previous flip request.

14. The method of claim 12 including:

in response to the request to flip the overlay flipping structure, reading a current position of the scan line and determining whether the current position of the scan line is less than a position of the scan line at the time of the previous flip request, and if so, performing step g.

15. In a computer coupled to a display controller for converting a pixmap in video memory to a display image on a display monitor and for superimposing an overlay image at an overlay address onto the display image, a display device interface implemented in the computer to enable application programs or other processes to draw visible and off-screen pixmaps into the video memory, the display device interface comprising:

an interface function for creating an instance of a display device object to represent the display controller;

the display device object including a create surface member function, the create surface member function for allocating pixel memory and for creating instances of surface objects to represent allocated regions of the pixel memory, including a primary surface object representing a display image displayed on the display monitor and an overlay surface object representing a flippable overlay image that the display controller superimposes on the display image;

the overlay surface object including:

a front buffer structure for storing a memory location of a front buffer in the video memory, and a back buffer structure attached to the front buffer structure, the back buffer structure for storing a memory location of a back buffer in the video memory;

wherein the overlay surface object includes a flip member function for determining when to write the memory location of the back buffer into the overlay address of the display controller to avoid tearing of an overlay image, for writing the memory location of the back buffer into the overlay address; and for updating the memory locations stored in the front and back buffer structures.

16. The display device interface of claim 15 wherein the overlay surface object includes a set color key member function for setting the color key for a region in the display image bounded by a window.

17. The display device interface of claim 16 wherein the overlay surface object includes a update overlay function for changing the size of the front and back buffers.

18. The display device interface of claim 16 wherein the overlay surface object includes a set overlay function for setting the position of the overlay image in the primary surface.

19. A computer readable medium on which is stored an application programming interface (API) for controlling access of application programs to a display controller that converts a pixmap in video memory to a display image on a display monitor and superimposes an image at an overlay address onto the display image, the API comprising instructions, which when executed by the computer, perform the steps of:

a) allocating a primary surface in the video memory;

b) allocating a front and back buffer in the video memory;

c) creating an overlay flipping structure including a front buffer structure and back buffer structure representing the front and back buffers, respectively;

d) storing memory locations of the front and back buffers in the front and back buffer structures, respectively;

e) setting a color key in the primary surface in an area bounded by the window;

f) controlling rendering of an overlay image into the back buffer;

in response to a request to flip the overlay flipping structure:

g) determining when to write the memory location of the back buffer into the overlay address of the display controller to avoid tearing of the overlay image;

h) writing the memory location of the back buffer into the overlay address; and i) updating the memory locations stored in the front and back buffer structures;

j) repeating at least steps f through i to display subsequent rendered overlays in the window.

* * * * *

UNITED STATES PATENT AND TRADEMARK OFFICE

CERTIFICATE OF CORRECTION

PATENT NO. : 5,850,232

DATED : December 15, 1998

INVENTOR(S) : Engstrom et al.

It is certified that error appears in the above-identified patent and that said Letters Patent is hereby corrected as shown below:

Column 7, line 15, "a bit request" should read --a blt request--.

Column 19, line 28, "biting" should read --blting--.

Column 19, line 38, "bits" should read --blts--.

Column 19, line 41, "biting" should read --blting--.

Column 19, line 46, "bit" should read --blt--.

Column 19, line 51, "biting" should read --blting--.

Column 20, line 33, "(IAL" should read --(HAL--.

Signed and Sealed this

Eleventh Day of April, 2000

*Attest:*

Q. TODD DICKINSON

*Attesting Officer*

*Director of Patents and Trademarks*